(12) United States Patent
Sun et al.

(10) Patent No.: US 11,509,205 B2
(45) Date of Patent: Nov. 22, 2022

(54) MAGNETIC POLE MODULE, ELECTRIC MOTOR ROTOR AND METHOD FOR MANUFACTURING ELECTRIC MOTOR ROTOR

(71) Applicant: BEIJING GOLDWIND SCIENCE & CREATION WINDPOWER EQUIPMENT CO., LTD., Beijing (CN)

(72) Inventors: Yang Sun, Beijing (CN); Quan Song, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 120 days.

(21) Appl. No.: 16/958,583

(22) PCT Filed: May 31, 2019

(86) PCT No.: PCT/CN2019/089553
§ 371 (c)(1),
(2) Date: Jun. 26, 2020

(87) PCT Pub. No.: WO2020/019868
PCT Pub. Date: Jan. 30, 2020

(65) Prior Publication Data
US 2021/0067019 A1 Mar. 4, 2021

(30) Foreign Application Priority Data
Jul. 27, 2018 (CN) .......................... 201810843126.3

(51) Int. Cl.
*H02K 1/27* (2022.01)
*H02K 1/28* (2006.01)
(Continued)

(52) U.S. Cl.
CPC ............ *H02K 29/03* (2013.01); *H02K 1/2786* (2013.01); *H02K 15/03* (2013.01); *H02K 7/183* (2013.01)

(58) Field of Classification Search
CPC ...... H02K 29/03; H02K 1/2786; H02K 15/03; H02K 7/183; H02K 7/1838; H02K 2213/12; H02K 1/278; H02K 1/28
See application file for complete search history.

(56) References Cited

U.S. PATENT DOCUMENTS

2003/0222514 A1   12/2003  Van Dine et al.
2008/0276449 A1*  11/2008  Groendahl ............ H01F 41/026
                                                  29/607
(Continued)

FOREIGN PATENT DOCUMENTS

CN   101478186 A    7/2009
CN   105071571 A   11/2015
(Continued)

OTHER PUBLICATIONS

International Search Report and Written Opinion in corresponding PCT Application No. PCT/CN2019/089553, dated Aug. 19, 2019, 9 pages.
(Continued)

*Primary Examiner* — Thomas Truong
(74) *Attorney, Agent, or Firm* — Bayes PLLC

(57) ABSTRACT

A magnetic pole module, an electric motor rotor and a method for manufacturing the electric motor rotor are provided. The electric motor rotor includes a rotor yoke and multiple magnetic pole modules disposed on the rotor yoke, each of the magnetic pole modules including a base plate, a housing, and a pair of magnetic pole units that are accommodated in an accommodating space formed by the base plate and the housing and have opposite polarities, and a pair of magnetic pole units in each of the magnetic pole modules (Continued)

are spaced apart from each other by a first distance in a circumferential direction of the rotor yoke. The electric motor rotor can give consideration to the properties, such as cogging torque and torque pulsation, of a generator, the protection of magnetic poles and the mechanical fixation of the magnetic pole.

17 Claims, 13 Drawing Sheets

(51) Int. Cl.
  *H02K 15/03* (2006.01)
  *H02K 29/03* (2006.01)
  *H02K 1/2786* (2022.01)
  *H02K 7/18* (2006.01)

(56) References Cited

U.S. PATENT DOCUMENTS

| | | | |
|---|---|---|---|
| 2009/0167103 A1* | 7/2009 | Jansen | H02K 1/278 310/156.48 |
| 2011/0285216 A1* | 11/2011 | Kurronen | H02K 1/28 310/45 |
| 2013/0169099 A1* | 7/2013 | Saban | H02K 1/278 310/156.12 |
| 2014/0042868 A1* | 2/2014 | Sullivan | H02K 1/28 29/598 |
| 2014/0152136 A1 | 6/2014 | Duford et al. | |
| 2016/0006306 A1* | 1/2016 | Dumas | H02K 1/2786 29/598 |

FOREIGN PATENT DOCUMENTS

| | | | | |
|---|---|---|---|---|
| CN | 105553144 A | | 5/2016 | |
| CN | 106849391 A | * | 6/2017 | H02K 1/06 |
| CN | 108777521 A | | 11/2018 | |

OTHER PUBLICATIONS

European Search Report in corresponding European Application No. 19841331.2 dated Feb. 18, 2021 (8 pages).

* cited by examiner

MAGNETIC POLE MODULE, ELECTRIC MOTOR ROTOR AND METHOD FOR MANUFACTURING ELECTRIC MOTOR ROTOR

CROSS-REFERENCE TO RELATED APPLICATIONS

The present application is a National Phase entry of International Application No. PCT/CN2019/089553, filed on May 31, 2019, which claims the benefits of priority to Chinese Patent Application No. 201810843126.3, filed on Jul. 27, 2018. Each of the above-identified applications is incorporated herein by reference in its entirety.

FIELD OF THE INVENTION

The present application relates to the technical field of electric machineries and, more particularly, to a magnetic pole module, a rotor of an electric machine including the magnetic pole module, and a method for manufacturing the rotor of the electric machine.

BACKGROUND

For a permanent magnet direct drive generator of the large-scale wind power generator set, the reductions of the cogging torque and torque pulsation of the generator are two important design targets. The smaller the cogging torque of the generator is, the lower a cut-in wind speed of the wind power generator set is, which may enlarge the rotating speed operating range of the set and improve the wind energy utilization rate therefore increasing the power generation amount of the power generator set. The smaller the torque pulsation of the generator is, the higher the operational stability of the wind power generator set is, and the longer the service life of the rotating component, such as, a bearing, is.

In order to reduce the cogging torque and torque pulsation of the generator, at present, a common solution in the electric machine design is that a stator has inclined slots or a rotor has inclined poles. If the stator has inclined slots, the coil may be difficult to be manufactured due to the problems such as the angle of the inclined slots, the length of the coil may also be increased, causing the resistance of the winding to be increased, which results in copper loss increasing of the electric machine and the heating increasing. For the rotor having inclined poles, referring to FIG. 1, if each magnetic pole on a rotor yoke is inclined in an axial direction, each magnetic pole 1 on the rotor yoke 2 needs to be inclined in the axial direction of the electric machine, which means that the magnetic pole 1 or the rotor yoke 2 should be manufactured into other shapes (that is, other shapes in addition to conventional magnetic pole shapes such as a cuboid), which may increase the manufacturing difficulty of the magnetic pole 1 or rotor yoke 2, and further increase the manufacturing difficult of a die and a tooling required when the magnetic pole 1 is produced and assembled, thus the yield of the magnetic pole 1 or the rotor yoke 2 is greatly reduced, resulting in the product cost increasing. In addition, referring to FIG. 2, that the rotor has inclined poles may be formed by multiple conventional magnetic poles 11 offset in the axial direction of the electric machine by a certain angle (that is, a segmented inclined pole), however, it needs a strict requirement for dimensional control accuracy when the magnetic poles 11 are assembled, which may reduce the yield and assembly efficiency of the magnetic pole 11, thereby reducing the production efficiency.

In addition, most importantly, the operating conditions of the wind power generator set are complex, a designed service life of the generator is usually required to be 20 years or even 25 years, thus it requires the fixing and protecting process of the rotor magnetic pole to provide higher mechanical fatigue resistance and corrosion resistance. The fixing process of the rotor magnetic pole mainly has two types including a surface pasting type and an insertion type. The surface pasting type magnetic pole fixing process is to bond and fix a magnetic pole on the surface of a rotor yoke through resin. Due to the fact that the magnetic pole is completely fixed to the surface of the rotor magnetic yoke through the resin bonding force during the surface pasting type magnetic pole fixing process, once a sealing weak point occurs in the execution process, the magnetic pole is prone to rust and powder due to insufficient sealing in a long-time high-temperature and high-humidity operating condition of the wind power generator set, thus bonding failure of the resin to the magnetic pole may be caused; and finally, the rusted magnetic pole breaks away from the rotor under the action of mutual repulsion between the magnetic poles and jumps out, resulting in an accident such as the worn of the stator and the rotor or even a generator fault. According to the insertion type magnetic pole fixing process, the magnetic pole is inserted into a groove located in the rotor iron core, and then two axially ends of the magnetic pole are fixed through the end plate, thus the magnetic pole is fixed. Although the insertion type magnetic pole fixing process achieves the reliable fixing of the magnetic pole through the groove fixing type structure, the hidden danger of insufficient magnetic pole sealing still exists. Under the long-time high-temperature and high-humidity operating condition, the magnetic pole of the wind power generator set is prone to rust and powder, thus the excitation flux of the rotor magnetic pole and the air gap magnetic induction intensity of the generator are weakened, and then the power generation amount of the wind power generator set is reduced.

SUMMARY

In order to solve the above-mentioned problems in the conventional technology, according to one aspect of the present application, a rotor of an electric machine with magnetic pole offset structural features that takes into account generator performance (cogging torque, torque pulsation), magnetic pole protection, and magnetic pole mechanical fixation is provided.

According to another aspect of the present application, a magnetic pole module, which can achieve good sealing and protection to a magnetic pole or a magnetic pole unit and is easily mechanically fixed, is provided.

According to another aspect of the present application, a method for manufacturing the rotor of the electric machine described above is provided.

According to one aspect of the present application, a rotor of an electric machine includes a rotor yoke and a plurality of magnetic pole modules arranged on the rotor yoke, each magnetic pole module includes a base plate, a housing, and a pair of magnetic pole units that are accommodated in an accommodating cavity formed by the base plate and the housing and have opposite polarities, the pair of magnetic pole units in each of the magnetic pole modules is spaced apart from each other by a first distance in a circumferential direction of the rotor yoke.

Optionally, the magnetic pole units in different magnetic pole modules adjacent in the circumferential direction may be spaced apart from each other by a second distance in a circumferential direction of the rotor yoke, and the first distance may be different from the second distance.

Optionally, the different magnetic pole modules adjacent in the circumferential direction may be spaced apart from each other by a predetermined distance in the circumferential direction of the rotor yoke.

Optionally, a protrusion may be provided on the base plate, and the protrusion may be arranged axially on a front surface of the base plate, each magnetic pole unit in the pair of magnetic pole units may abut against the protrusion on opposite sides of the protrusion, respectively, each magnetic pole unit may include a plurality of magnetic poles aligned in an axial direction, and the plurality of magnetic poles in each magnetic pole unit may have the same polarity.

Optionally, the front surface of each magnetic pole unit may be bonded to an inner surface of the housing by an adhesive.

Optionally, all gaps between the housing, the base plate, and the pair of magnetic pole units may be filled with resin.

Optionally, multiple base plate through holes may be arranged on the base plate. Multiple housing through holes corresponding to the plurality of the base plate through holes may be arranged in the housing. Multiple threaded holes may be arranged in the rotor yoke. The multiple the base plate through holes, multiple the housing through holes and multiple threaded holes may be aligned with each other, and the magnetic pole module may be mechanically fixed on the rotor yoke by allowing the fasteners to pass through the multiple base plate through holes, the multiple housing through holes and the multiple threaded holes.

Optionally, the multiple magnetic pole modules may be arranged on the rotor yoke in rows along the circumferential direction of the rotor yoke. Each of a row of magnetic pole modules may be aligned with each other in the circumferential direction of the rotor yoke, and the multiple magnetic pole modules may be arranged in columns on the rotor yoke in an axial direction parallel to a central rotational axis of the rotor of the electric machine, each of a column of magnetic pole modules may be aligned with each other in the axial direction parallel to the central rotational axis of the rotor of the electric machine.

Optionally, the polarities of the magnetic pole units adjacent in the circumferential direction in different magnetic pole modules may be opposite, and the polarities of the magnetic pole units adjacent in the axial direction in different magnetic pole modules may be the same.

According to another aspect of the present application, a magnetic pole module includes a base plate and a first magnetic pole unit and a second magnetic pole unit arranged on a front surface of the base plate. The first magnetic pole unit and the second magnetic pole unit have opposite polarities and are spaced apart from each other by a first distance; and a housing mounted to the first magnetic pole unit, the second magnetic pole unit and the base plate.

Optionally, the magnetic pole module may further include a protrusion that may be arranged on the front surface of the base plate and located between the first magnetic pole unit and the second magnetic pole unit.

Optionally, the first magnetic pole unit and the second magnetic pole unit may be bonded together with an inner surface of the housing by an adhesive.

Optionally, the base plate may include multiple base plate through holes arranged on two sides of the base plate, the housing may include multiple housing through holes arranged on two sides of the housing, and the multiple the base plate through holes may be aligned with the multiple housing through holes.

Optionally, all gaps between the housing, the base plate, the first magnetic pole unit, and the second magnetic pole unit may be filled with resin.

Optionally, the first magnetic pole unit and the second magnetic pole unit may be spaced apart from each other in a width direction, each magnetic pole unit may include multiple magnetic poles aligned in a length direction, and the multiple magnetic poles in each magnetic pole unit have the same polarity.

According to another aspect of the present application, a method for manufacturing a rotor of an electric machine is provided. The method includes the steps of: arranging a pair of magnetic pole units of opposite polarities on a base plate side by side and spacing a pair of magnetic pole units apart from each other by a first distance; mounting the housing on the pair of magnetic pole units and the base plate and forming a sealed cavity between the housing and the base plate; pouring resin into the sealed cavity formed by the housing and the base plate, thereby forming the magnetic pole module; and arranging multiple magnetic pole modules on the rotor yoke, so that adjacent magnetic pole units in the different magnetic pole modules adjacent in the circumferential direction are spaced apart from each other by a second distance along the circumferential direction of the rotor yoke, and the first distance is different from the second distance.

Optionally, the method may further include the steps of: arranging a protrusion in the middle of the base plate before arranging a pair of magnetic pole units on the base plate, and arranging a pair of magnetic pole units on opposite sides of the protrusion.

Optionally, an adhesive may be applied to the front surface of each magnetic pole unit of a pair of magnetic pole units for bonding the front surface to the housing before mounting the housing; after the housing is mounted to a pair of magnetic pole units, the housing and the front surface of the pair of magnetic pole units may be pressed such that the adhesive between the housing and the front surface of the pair of magnetic pole units is fully spread; and an external seam between the housing and the base plate may be sealed such that the housing and the base plate form a sealed cavity.

Optionally, the housing may further include a vacuum nozzle and an injection nozzle arranged on two end surfaces of the housing, respectively. The method may further include the steps of: pouring resin into an interior of the sealed cavity formed by the housing and the base plate through the vacuum nozzle and the injection nozzle, so that all gaps among the housing, the base plate and the pair of magnetic pole units is filled with the resin; removing the vacuum nozzle and the injection nozzle after the resin infusion is completed, and applying an encapsulant to the position, where the injection nozzle and the vacuum nozzle are removed, for sealing.

Optionally, multiple base plate through holes may be arranged on the base plate, multiple housing through holes may be arranged in the housing, and multiple threaded holes may be arranged in the rotor yoke. The method may further include the steps of: mechanically fixing the multiple magnetic pole modules to the rotor yoke by to allowing the multiple to pass fasteners through the multiple base plate through holes, the multiple housing through holes and the multiple threaded holes, respectively; and making the polarities of the magnetic pole units adjacent in the circumferential direction in the different magnetic pole modules be opposite and making the polarities of the magnetic pole units adjacent in the axial direction in the different magnetic pole modules be the same.

By adopting the rotor of the electric machine disclosed according to the present application, the cogging torque and torque pulsation of the generator may be reduced, meanwhile, the magnetic pole or the magnetic pole unit is ensured to be reliably fixed on the rotor yoke, reliable sealing of the magnetic pole or the magnetic pole unit is achieved, and therefore the generator performance (cogging torque, torque pulsation), magnetic pole protection and magnetic pole mechanical fixing are considered.

By adopting the magnetic pole module according to the present application, the magnetic pole or the magnetic pole unit may be effectively and reliably sealed, and the mechanical fixing of the magnetic pole or the magnetic pole unit is facilitated.

By adopting the method for manufacturing the rotor of the electric machine according to the present application, the manufacturing time of the magnetic pole module may be reduced, reliable sealing protection and fixing of the magnetic pole may be realized, meanwhile, the magnetic pole arrangement mode capable of reducing the cogging torque and torque pulsation of the generator is provided.

Figure 1:
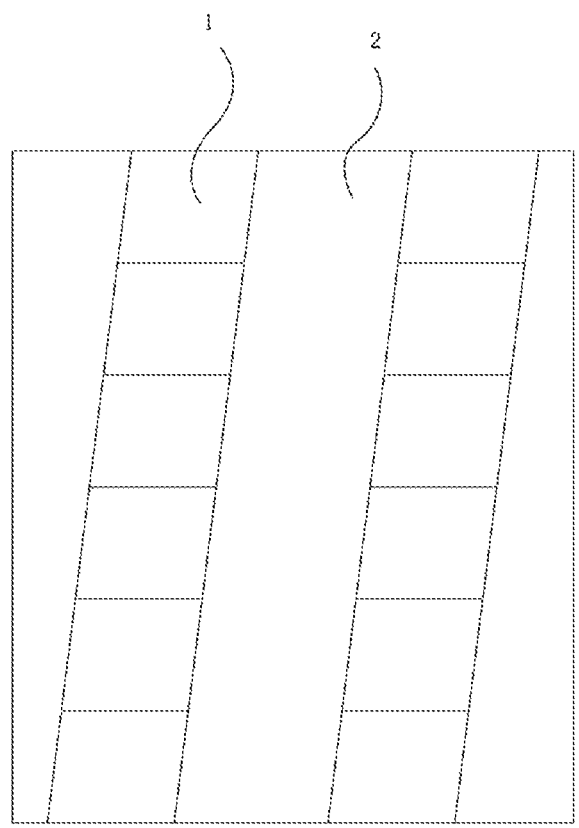
FIG. 1 is a schematic view showing a portion of a rotor of an electric machine in the conventional technology adopting a rotor inclined pole mode.
Figure 2:
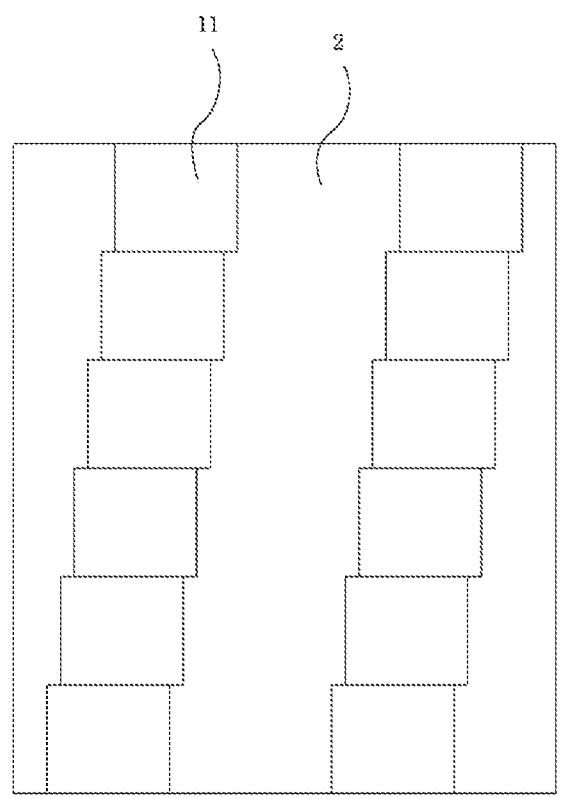
FIG. 2 is a schematic view showing a portion of a rotor of an electric machine in the conventional technology adopting a rotor segmented inclined pole mode.

Reference numerals in the figures as follows:

| | |
|---|---|
| 1 magnetic pole, | 2 rotor yoke, |
| 11 magnetic pole, | 100 magnetic pole module, |
| 110 base plate, | 111a front surface, |
| 111b back surface, | 112a first side surface, |
| 112b second side surface, | 113a first end surface, |
| 113b second end surface, | 114 protrusion, |
| 115 base plate through hole, | 120 first magnetic pole unit, |
| 121a front surface, | 121b back surface, |
| 122a first side surface, | 122b second side surface, |
| 123a first end surface, | 123b second end surface, |
| 130 second magnetic pole unit, | 131a front surface, |
| 131b back surface, | 132a first side surface, |
| 132b second side surface, | 133a first end surface, |
| 133b second end surface, | 140 housing, |
| 141a first portion, | 141b second portion, |
| 141c third portion, | 145 housing though hole, |
| 148 vacuum nozzle, | 149 injection nozzle, |
| 150 rotor yoke, | 160 spacer, |
| 170 fastener, | 1000 rotor of electric machine, |
| 200 magnetic pole module, | 210 base plate, |
| 220 first magnetic pole unit, | 230 second magnetic pole unit, |
| 240 housing, | 248 vacuum nozzle, |
| 249 injection nozzle, | 250 rotor yoke, |
| 251 threaded hole, | 260 spacer, |
| 270 fastener, | 280 clamping bar, |
| 281 protruding portion, | 282 first edge portion, |
| 283 second edge portion, | 284 through hole, |
| 2000 rotor of electric machine. | |

DETAIL DESCRIPTION OF EMBODIMENTS

In order to enable those skilled in the art to better understand the technical concepts of the present application, specific embodiments of the present application will be described in detail below in conjunction with the appended drawings, in the drawings, the same reference numerals refer to the same component throughout.

As referred to herein, "axial" refers to an axial direction parallel to a central rotational axis of a rotor of an electric machine, "circumferential" refers to a circumferential direction along a peripheral direction of the rotor, "radial" refers to a radius direction of the electric machine.

FIGS. 3 to 9 show a magnetic pole module 100 according to a first embodiment of the present application and a rotor 1000 of an electric machine including the magnetic pole module 100. Referring to FIGS. 3 to 8, the magnetic pole module 100 may basically include a base plate 110, a pair of magnetic pole units (a first magnetic pole unit 120 and a second magnetic pole unit 130) and a housing 140. The pair of magnetic pole units is arranged on the base plate 110 and spaced apart from each other by a predetermined distance. The housing 140 covers the pair of magnetic pole units, and seals the pair of magnetic pole units.

Multiple magnetic pole modules 100 will be fixed to a surface of the rotor yoke 150, thereby forming the rotor 1000 of the electric machine. In the following description, for ease of description, the structure of the magnetic pole module 100 will be described by terms for indicating direction such as "axial", "circumferential", "radial" and the like.

Figure 3:
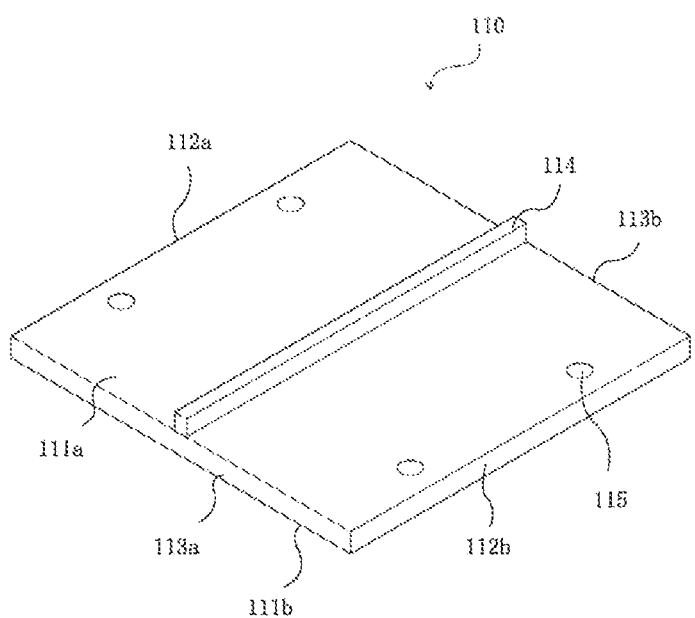
FIG. 3 is a schematic structural view of a base plate of a magnetic pole module according to a first embodiment of the present application.
Figure 4:
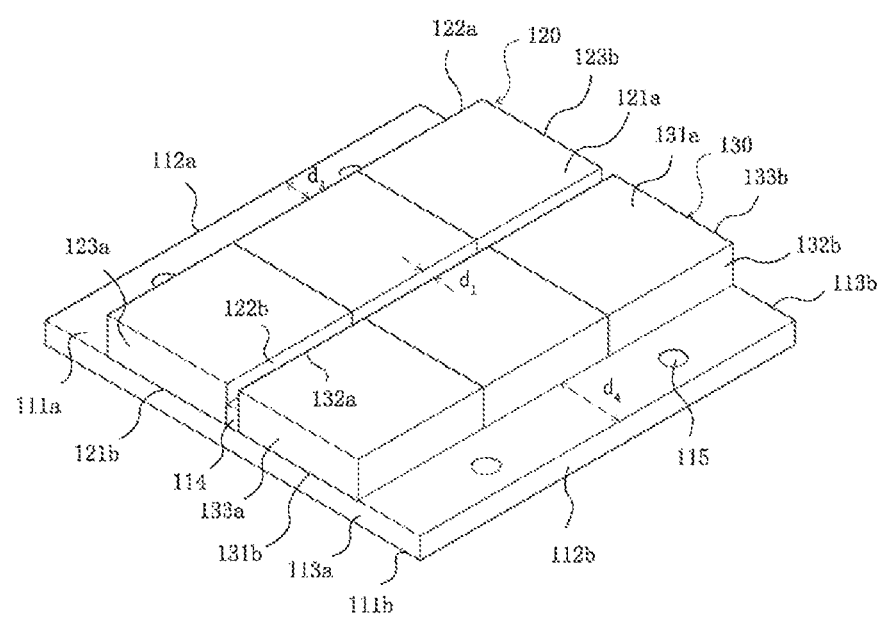
FIG. 4 is a schematic structural view of the base plate and a magnetic pole unit of the magnetic pole module according to the first embodiment of the present application.

As shown in FIGS. 3 and 4, the base plate 110 may be a rectangular or square plate having a specific thickness. The base plate 110 may have a front surface 111a and a back surface 111b in a thickness direction. The first magnetic pole unit 120 and the second magnetic pole unit 130 may be arranged on the front surface 111a of the base plate 110. The base plate 110 may also have a first side surface 112a and a second side surface 112b in a width direction and a first end surface 113a and a second end surface 113b in a length direction. The base plate 110 may be made of a permeability magnetic material.

A protrusion 114 may be arranged on the front surface 111a of the base plate 110 along the length direction for separating the first magnetic pole unit 120 and the second magnetic pole unit 130. Preferably, the protrusion 114 may be fixed on a symmetrical centerline of the base plate 110. As shown in FIG. 3, the protrusion 114 may be an elongated boss arranged on the base plate 110. The protrusion 114 may be bonded to the front surface 111a of the base plate 110 by an adhesive (for example, a structural adhesive), or, it may also be integrally formed with the base plate 110. As shown in FIG. 3, the length of the protrusion 114 is equal to the length of the base plate 110, that is, two ends of the protrusion 114 and the end surface of the base plate 110 are aligned with each other, and embodiments of the present application are not limited thereto. The length of the protrusion 114 may also be different from the length of the base plate 110, and the protrusion 114 may have any suitable shape. The protrusion 114 may also consist of multiple discrete portions (such as pillars), as long as the protrusion 114 may be arranged between two columns of magnetic pole units 120, 130 to separate the two columns of magnetic pole units 120, 130.

In the width direction, the first magnetic pole unit 120 and the second magnetic pole unit 130 may abut against the protrusion 114 on opposite sides of the protrusion 114, respectively. The first magnetic pole unit 120 and the second magnetic pole unit 130 are separated by the protrusion 114, so that the two column of magnetic pole units are physically separated from each other, thereby preventing the first magnetic pole unit 120 and the second magnetic pole unit 130 from moving relative to each other (for example, due to the magnetic field effect) due to a long-term operation of the electric machine.

The first magnetic pole unit 120 and the second magnetic pole unit 130 may be spaced apart from each other in the width direction, each of the first magnetic pole unit 120 and the second magnetic pole unit 130 may include one magnetic pole, respectively, and each of the first magnetic pole unit 120 and the second magnetic pole unit 130 may also include multiple magnetic poles aligned in the length direction, respectively. The multiple magnetic poles in each magnetic pole unit may have the same polarity. As shown in FIG. 4, each magnetic pole unit includes three magnetic poles. The polarities of the first magnetic pole unit 120 and the second magnetic pole unit 130 are opposite to form a pair of magnetic pole units. For example, the first magnetic pole unit 120 may be a N pole (that is, the polarity of each magnetic pole in the first magnetic pole unit 120 is N), and the second magnetic pole unit 130 may be an S pole (that is, the polarity of each magnetic pole in the second magnetic pole unit 130 is S).

As shown in FIG. 4, the first magnetic pole unit 120 may have a front surface 121a and a back surface 121b in the thickness direction, a first side surface 122a and a second side surface 122b in the width direction, and a first end surface 123a and a second end surface 123b in the length direction. The second magnetic pole unit 130 may have a front surface 131a and a back surface 131b in the thickness direction, a first side surface 132a and a second side surface 132b in the width direction, a first end surface 133a and a second end surface 133b in the length direction.

The back surface 121b of the first magnetic pole unit 120 and the back surface 131b of the second magnetic pole unit 130 may be bonded to the front surface 111a of the base plate 110 by an adhesive (for example, a structural adhesive). The width of the protrusion 114 may be represented by $d_1$, therefore, the distance $d_1$ may be maintained between the two columns of magnetic pole units, which is referred to below as a first distance $d_1$. In other words, the first distance $d_1$ may be spaced between the second side surface 122b, in contact with the protrusion 114, of the first magnetic pole unit 120 and the first side surface 132a, in contact with the protrusion 114, of the second magnetic pole unit 130.

Furthermore, in the length direction, two ends of the first magnetic pole unit 120 and the second magnetic pole unit 130 may be aligned with the base plate 110, that is, the first end surface 123a of the first magnetic pole unit 120 and the first end surface 133a of the second magnetic pole unit 130 may be aligned with the first end surface 113a of the base plate 110, and the second end surface 123b of the first magnetic pole unit 120 and the second end surface 133b of the second magnetic pole unit 130 may be aligned with the second end surface 113b of the base plate 110. However, such an arrangement is merely an example, and a case that the two ends of the magnetic pole units may be slightly misaligned with or offset from the two ends of the base plate may also be considered.

The base plate 110 may also have multiple base plate through holes 115 arranged on two sides of the base plate 110. The multiple base plate through holes 115 may be arranged at locations on the base plate 110 where the magnetic pole units are not placed, for example, the multiple base plate through holes 115 may be arranged towards the first side surface 112a and the second side surface 112b, respectively, of the base plate 110. As shown in FIG. 4, four base plate through holes 115 may be provided on each base plate 110, and two base plate through holes 115 may be provided on each side of the base plate 110.

Figure 5:
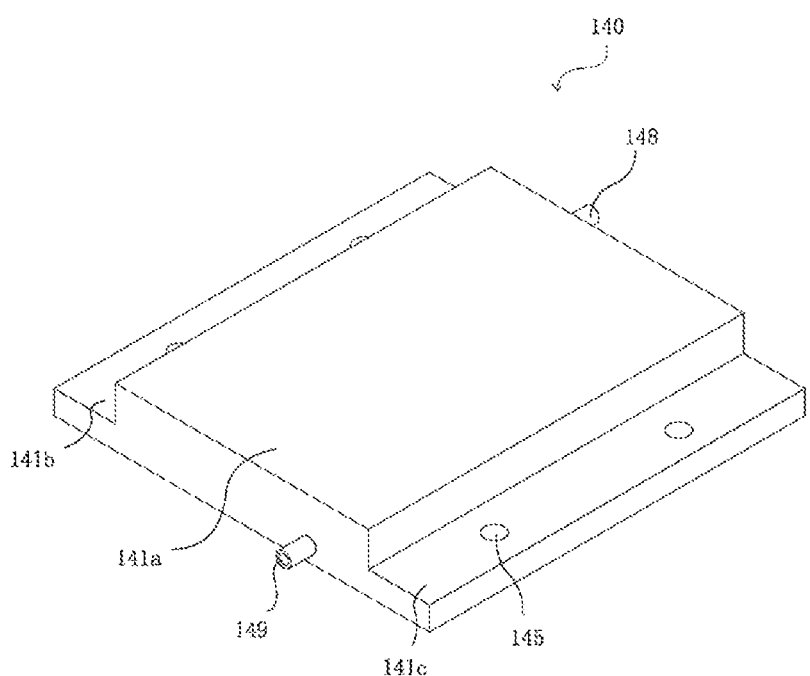
FIG. 5 is a schematic structural view of a housing of the magnetic pole module according to the first embodiment of the present application.

As shown in FIG. 5, the housing 140 may be fastened onto the base plate 110, the first magnetic pole unit 120 and the second magnetic pole unit 130 to seal the first magnetic pole unit 120 and the second magnetic pole unit 130 on the base plate 110.

Specifically, the housing 140 may cover the base plate 110 and form an accommodating cavity between the housing 140 and the base plate 110, and the first magnetic pole unit 120 and the second magnetic pole unit 130 may be located and sealed in the accommodating cavity.

In order to seal and fix the first magnetic pole unit 120 and the second magnetic pole unit 130 onto the base plate 110 and to maintain the compactness of the structure, the housing 140 may have a shape that conforms to an outer surface of the structure after the magnetic pole units 120 and 130 are mounted on the base plate 110, so as to be in close contact with the outer surfaces of the first magnetic pole unit 120, the second magnetic pole unit 130 and the base plate 110.

For example, the housing 140 may have a "convex" shaped shape. Along the width direction, the housing 140 may include a first portion 141a covering the outer surfaces of the first magnetic pole unit 120 and the second magnetic pole unit 130, and a second portion 141b and a third portion 141c located on two sides of the first portion 141a and covering the base plate 110. The first portion 141a may be arranged and in contact with the front surface 121a of the first magnetic pole unit 120 and the front surface 131a of the second magnetic pole unit 130 on the base plate 110. The second portion 141b and the third portion 141c may cover portions, on two sides of the magnetic pole units 120 and 130, of the base plate 110.

One side of the housing 140 may be open to provide access to the base plate 110, the first magnetic pole unit 120 and the second magnetic pole unit 130. Thus, after the housing 140 covers the first magnetic pole unit 120 and the second magnetic pole unit 130 and the base plate 110, the first magnetic pole unit 120 and the second magnetic pole unit 130 are integrally sealed in the housing 140, and the side surfaces and end surfaces of the base plate 110 are also covered, and only the back surface 111b of the base plate 110 is exposed.

When the housing 140 is mounted onto the base plate 110, the first magnetic pole unit 120 and the second magnetic pole unit 130, an inner surface of the housing 140 may be in close contact and bonded with the first magnetic pole unit 120, the second magnetic pole unit 130 and the base plate 110 by an adhesive.

The close contact and firm bonding of the first magnetic pole unit 120 and the second magnetic pole unit 130 with the housing 140 may be ensured by the following method: the adhesive is applied on the front surface 121a of the first magnetic pole unit 120 and the front surface 131a of the second magnetic pole unit 130 (for example, by dispensing or coating the adhesive layer by glue line) before mounting the housing 140. Thereafter, the housing 140 is mounted onto the first magnetic pole unit 120 and the second magnetic pole unit 130, and the housing 140 together with the first magnetic pole unit 120 and the second magnetic pole unit 130 are pressed, ensuring that the adhesive between the inner surface of the housing 140 and the front surface of the first magnetic pole unit 120 and the second magnetic pole unit 130 is fully spread, thereby fully filling the gap between the housing 140 and the first magnetic pole unit 120 and the second magnetic pole unit 130 and avoiding occurring air pockets therebetween. Thereafter, the curing adhesive is heated.

In order to reduce the impact on the air gap between the rotor and the stator, the housing 140 should be closely attached to the front surfaces of the first magnetic pole unit 120 and the second magnetic pole unit 130. By the method of gluing (for example, coating the adhesive) and spreading the glue layer (for example, the adhesive layer) against the housing 140, not only is a 100% filling ensured, but also cavity will not occur due to the small gap in the vacuum infusion resin process (described in more detail below), and the air gap is not impacted.

After the housing 140 is mounted, external seams between the housing 140 and the base plate 110 may be sealed with an encapsulant, so as to form a sealed cavity between the housing 140 and the base plate 110 for accommodating the first magnetic pole unit 120 and the second magnetic pole unit 130.

The housing 140 may also include an injection nozzle 149 and a vacuum nozzle 148 arranged on two end surfaces of the housing 140. The injection nozzle 149 and the vacuum nozzle may be configured to perform the vacuum infusion resin to the sealed cavity formed by the housing 140 and the base plate 110, thereby all gaps among the housing 140 and the base plate 110 and the housing 140 and the first magnetic pole unit 120 and the second magnetic pole unit 130 are filled.

The gap between the housing 140 and the side surface and the end surface of the magnetic pole unit, and between the housing 140 and the outer surface of the base plate 110, may be designed with a larger value (because the air gap is not affected), thereby ensuring that all gaps are 100% filled with the resin during vacuum infusion.

Figure 8:
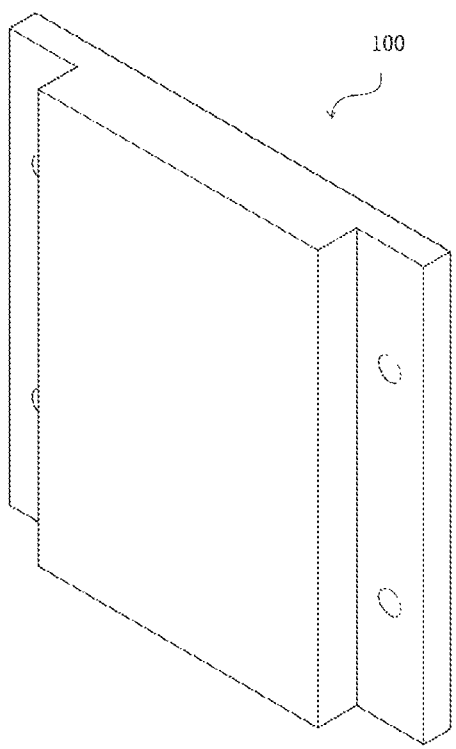
FIG. 8 is a schematic structural view of the magnetic pole module (removing the injection nozzle and the vacuum nozzle) according to the first embodiment of the present application.

After the vacuum infusion resin is completed on the magnetic pole module 100, the injection nozzle 149 and the vacuum nozzle 148 may be removed. After the injection nozzle 149 and the vacuum nozzle 148 are removed, the encapsulant is applied to the position where the injection nozzle 149 and the vacuum nozzle 148 are removed for sealing. For example, the exposed glue injection port and the vacuum port may be sealed by a sealant. As shown in FIG. 8, after the magnetic pole module 100 is manufactured, the injection nozzle 149 and the vacuum nozzle 148 are cut and flattened, so that the end surface of the housing 140 is flat.

The housing 140 may also include multiple housing through holes 145 arranged on two opposite sides of the magnetic pole unit. The locations of the housing through holes 145 on the housing 140 corresponds to the locations of the base plate through holes 115 arranged on the base plate 110. When the housing 140 is mounted onto the base plate 110, the first magnetic pole unit 120 and the second magnetic pole unit 130, the multiple housing through holes 145 on the housing 140 correspond to multiple base plate through holes 115 on the base plate 110, respectively.

The base plate through holes 115 and the housing through holes 145 may be formed when the base plate 110 and the housing 140 are manufactured, respectively. After the housing 140 is mounted to the base plate 110 and the magnetic pole units 120, 130, when the vacuum infusion resin is performed on the sealed cavity formed by the housing 140 and the base plate 110, in order to avoid the base plate through hole 115 and the housing through hole 145 from affecting the formation of the sealed cavity and to prevent the base plate through hole 115 and the housing through hole 145 from being sealed by the infusion resin, the magnetic pole module (not completed) may be mounted on a specific tooling to arrange the base plate through hole 115 and the housing through hole 145 on the specific component of the tooling, temporarily plugging the base plate through holes 115 and the housing through holes 145. Thus, the base plate 110 and the housing 140 form the sealed cavity, thereby subsequent suction vacuum and infusion resin operations are performed. In addition, optionally, after the housing 140 is mounted onto the base plate 110 and the magnetic pole units 120, 130, an encapsulant may be used to seal the seam between the housing through hole 145 and the base plate through hole 115, thereby allowing the base plate 110 and housing 140 to form the sealed cavity.

Furthermore, although the base plate through holes 115 and the housing through holes 145 may be formed when the base plate 110 and the enclosure 140 are manufactured separately as described above with reference to the figures, it is not limited thereto. The base plate 110 and the housing 140 without the through holes may also be formed first, and after resin infusion is completed, the through holes are opened in the magnetic pole module 100.

The housing 140 may be made of a non-permeability magnetic material. The magnetic pole unit (pole) is bonded on the base plate 110 made of a permeability magnetic material, and then the adhesive is applied and the housing 140 of the non-permeability magnetic material is used for covering, and the external seam between the edge of the housing 140 and the edge of the base plate 110 and the seam between the housing through hole 145 and the base plate through hole are coated with the sealant, and the sealed cavity formed by the housing 140 and the base plate 110 for accommodating the magnetic pole unit is applied with the vacuum resin infusion, so that the sealing protection of the magnetic pole may be effectively realized.

Figure 9:
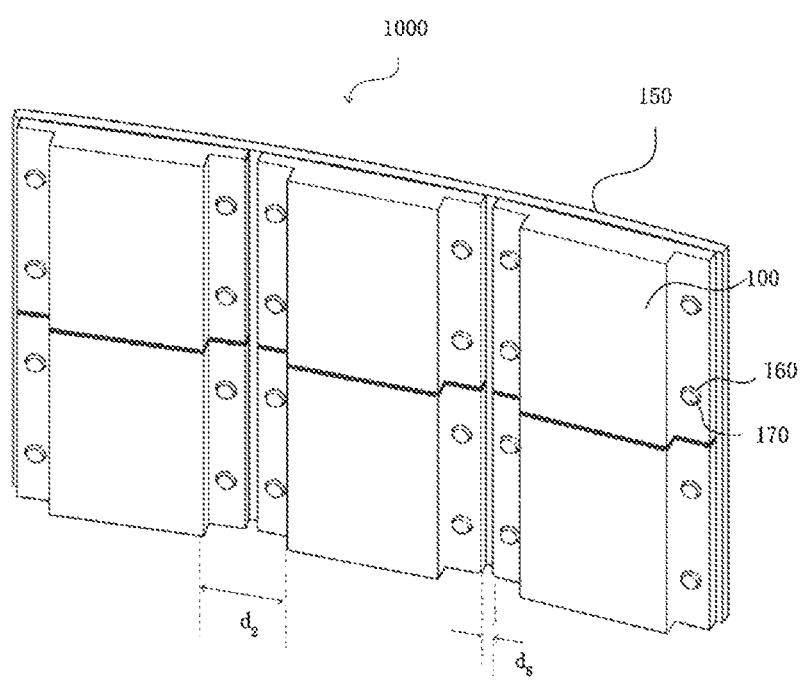
FIG. 9 is a schematic structural view of a portion of a rotor of an electric machine according to the first embodiment of the present application.

The rotor 1000 of the electric machine may be formed by mounting the magnetic pole module 100 on an inner surface of the rotor yoke 150. FIG. 9 shows a schematic structural view of a portion of the rotor 1000 of the electric machine according to an embodiment of the present application. As shown in FIG. 9, the rotor 1000 of the electric machine may include a rotor yoke 150 and multiple magnetic pole modules 100 arranged on the rotor yoke 150. The back surface 111b of the base plate 110 of the magnetic pole module 100 may be in contact with a radial inner surface of the rotor yoke 150.

Multiple threaded holes (not visible in the figures) may be provided on the rotor yoke 150. The multiple threaded holes on the rotor yoke 150 may correspond to the multiple base plate through holes 115 on the base plate 110 of the magnetic pole module 100 and the multiple housing through holes 145 on the housing 140 and be aligned with each other when the magnetic pole module 100 is mounted on the rotor yoke 150, such that the fasteners 170 (a spacer 160 may be added) pass through the base plate through holes 115, the housing through holes 140 and threaded holes of the rotor yoke 150, thereby mechanically securing the magnetic pole module 100 to the rotor yoke 150.

As shown in FIG. 9, the multiple magnetic pole modules 100 may be arranged in columns on the rotor yoke 150 in an axial direction (that is, axial) and parallel to a central rotation axis of the rotor 1000 of the electric machine, and, each magnetic pole module 100 in the column of magnetic pole modules 100 is aligned with each other in the axial direction (that is, axial) and parallel to the central rotation axis of the rotor 1000 of the electric machine, and the first magnetic pole unit 120 and the second magnetic pole unit 130 in each magnetic pole module 100 are axially aligned with each other, respectively. The polarities of the magnetic pole units adjacent in the axial direction in the different magnetic pole modules are the same, that is, the magnetic pole units with the same polarity are aligned in the axial direction. As shown in FIG. 9, the columns of magnetic pole modules 100 are arranged vertically along the axial direction, and the magnetic pole modules 100 are not offset or tilted from each other.

Further, the multiple magnetic pole modules 100 may be arranged in rows on the rotor yoke 150 in the circumferential direction (that is, circumferential) of the rotor yoke 150, each magnetic pole module 100 in a row of magnetic pole modules 100 is aligned with each other in the circumferential direction (that is, circumferential) of the rotor yoke 150, and the first magnetic pole unit 120 in each magnetic pole module 100 is adjacent to the second magnetic pole unit 130 in the adjacent magnetic pole module 100. The polarities of magnetic pole units adjacent in the circumferential direction in the same magnetic pole module or in different magnetic pole modules are opposite, that is, the magnetic pole units with different polarities in the circumferential direction are alternately arranged. For example, the polarity of the first magnetic pole unit 120 and the second magnetic pole unit 130 in one magnetic pole module 100 may be opposite, as described above, when the polarity of the first magnetic pole unit 120 in one magnetic pole module 100 is N and the polarity of the second magnetic pole unit 130 is S, the second magnetic pole unit 130 (polarity S) in the one magnetic pole module 100 in the row of magnetic pole modules 100 is adjacent to the first magnetic pole unit 120 (polarity N) of another adjacent magnetic pole module 100, that is, a magnetic pole unit arrangement in a polarity alternating form of N-S-N-S is formed in the circumferential direction of the rotor yoke 150.

When the magnetic pole module 100 is arranged on the rotor yoke 150, a pair of magnetic pole units 120 and 130 in each magnetic pole module 100 is spaced apart from each other along the circumferential direction of the rotor yoke 150 by a first distance $d_1$. Furthermore, the multiple pole modules 100 are further arranged such that adjacent magnetic pole units adjacent in the circumferential direction in different magnetic pole modules 100 are spaced apart from each other by a second distance $d_2$ along the circumferential direction of the rotor yoke 150, as shown in FIG. 9.

Referring to FIG. 4, the first side surface 122a of the first magnetic pole unit 120 may be spaced apart from the first side surface 112a of the base plate 110 by a third distance $d_3$. The second side surface 132b of the second magnetic pole unit 130 may be spaced apart from the second side surface 112b of the base plate 110 by a fourth distance $d_4$. Furthermore, as shown in FIG. 9, during the assembly of the magnetic pole module 100, a fifth distance $d_5$ may be present between two adjacent magnetic pole modules 100. In this case, the second distance $d_2$ may be approximately equal to the sum of the third distance $d_3$, the fourth distance $d_4$, and the fifth distance $d_5$ (taking into account the respective gaps between the housing 140 and the base plate 110 and the magnetic pole units 120, 130).

Thus, the distance between two columns of magnetic pole units (the first magnetic pole unit 120 and the second magnetic pole unit 130) in one magnetic pole module 100 is the first distance $d_1$, while the distance between adjacent two columns of magnetic pole units in two adjacent magnetic pole modules 100 is the second distance $d_2$, and $d_1$ is not equal to $d_2$. In the present embodiment, $d_1 < d_2$.

Thus, in the magnetic pole distribution of the rotor of the electric machine according to the embodiments of the present application, all of the magnetic pole units on the rotor yoke are not equidistantly distributed, but rather the spacing between each pair of magnetic pole units (that is, a pair of magnetic pole units in one magnetic pole module) is equal, while the distance between each magnetic pole unit and an adjacent magnetic pole unit is unequal. By adopting the magnetic pole offset structure type, the cogging torque and torque pulsation of the permanent magnet direct drive generator may be reduced.

After all the multiple magnetic pole modules 100 are assembled, a resin vacuum infusion may be performed on all of the magnetic pole modules 100 as a whole, so as to achieve effective glue filling and sealing for the gap between the magnetic pole module 100 and the rotor yoke 150, and the respective gaps in the fasteners 170, the spacers 160, the threaded holes on the base plate through holes 115, the housing through holes 145 and the rotor yoke 150.

The rotor of the electric machine may also include other components (for example, structural members such as rotor brackets), in the present embodiment, for illustrative purposes, only the rotor yoke 150 and the magnetic pole module 100 arranged and fixed on the rotor yoke 150 are shown and described.

For the magnetic pole offset structure type according to the embodiment of the present application, each magnetic pole module 100 is manufactured separately, and each magnetic pole module 100 includes a pair of magnetic pole units (a first magnetic pole unit 120 and a second magnetic pole unit 130 opposite in polarity), which greatly reduces man hours when compared to conventional "each magnetic pole module includes a base plate, a column of magnetic poles, a housing".

Further, by adopting such the magnetic pole module 100 and the magnetic pole offset structure type, the magnetic pole offset may be effectively achieved so as to reduce cogging torque and torque pulsation, and the magnetic pole units 120, 130 in each magnetic pole module 100 and the base plate 110, the magnetic pole units 120, 130 and the housing 140, the base plate 110 and the housing 140 are sufficiently bonded by means of adhesive bonding and vacuum potting, thereby achieving 100% glue filling to all gaps in the magnetic pole module 100, and reliable sealing of the magnetic poles is achieved.

In addition, reliable mechanical fixation of the magnetic pole module 100 and the magnetic pole units 120, 130 is achieved by providing holes in the base plate 110, the housing 140 and the rotor yoke 150 and using the fasteners 170 (the spacer 160 may be added).

In conclusion, by adopting the magnetic pole module 100 and the rotor 1000 of the electric machine described above, not only the magnetic pole offset structure type may be realized, which can effectively reduce the cogging torque and torque pulsation of the permanent magnet direct drive generator, but also the magnetic pole (the magnetic pole unit) may be effectively sealed and firmly mechanically fixed on the rotor yoke 150, thereby achieving the effective sealing of the magnetic pole and the safe and reliable fixation of the magnetic pole module 100, and ensuring the use reliability of the magnetic pole under high temperature and high humidity operating conditions in the whole life cycle of the generator. Therefore, the magnetic pole module 100 provided by the present application and the rotor 1000 of the electric machine including the magnetic pole module 100 and having the magnetic pole offset structural features take into account for the generator performance (cogging torque, torque pulsation), the magnetic pole protection and the magnetic pole mechanical fixation.

A method for manufacturing the magnetic pole module 100 and the rotor 1000 of the electric machine according to the first embodiment of the present application will be described below in conjunction with FIGS. 3 to 9.

First, as shown in FIG. 3, the base plate 110 having multiple base plate through holes 115 is manufactured. And then, the protrusion 114 is provided in the middle (preferably, at a symmetrical center line) of the base plate 110, and the protrusion 114 may be bonded to the front surface 111a of the base plate 110 by an adhesive. Herein, the base plate 110 provided with multiple base plate through holes 115 may also be integrally formed with the protrusion 114.

Then, as shown in FIG. 4, a pair of magnetic pole units (the first magnetic pole unit 120 (pole N) and the second magnetic pole unit 130 (pole S) with opposite polarities is arranged on the base plate 110 side by side, such that the pair of magnetic pole units are spaced apart by a first distance d1. Thus the first magnetic pole unit 120 and the second magnetic pole unit 130 are arranged against the protrusion 114 on opposite sides of the protrusion 114, and the back surface 121b of the first magnetic pole unit 120 and the back surface 131b of the second magnetic pole unit 130 may be bonded to the front surface 111a of the base plate 110 by the adhesive. The first magnetic pole unit 120 and the second magnetic pole unit 130 may be separated by the protrusion 114 and symmetrically distributed on the opposite sides of the protrusion 114.

Figure 6:
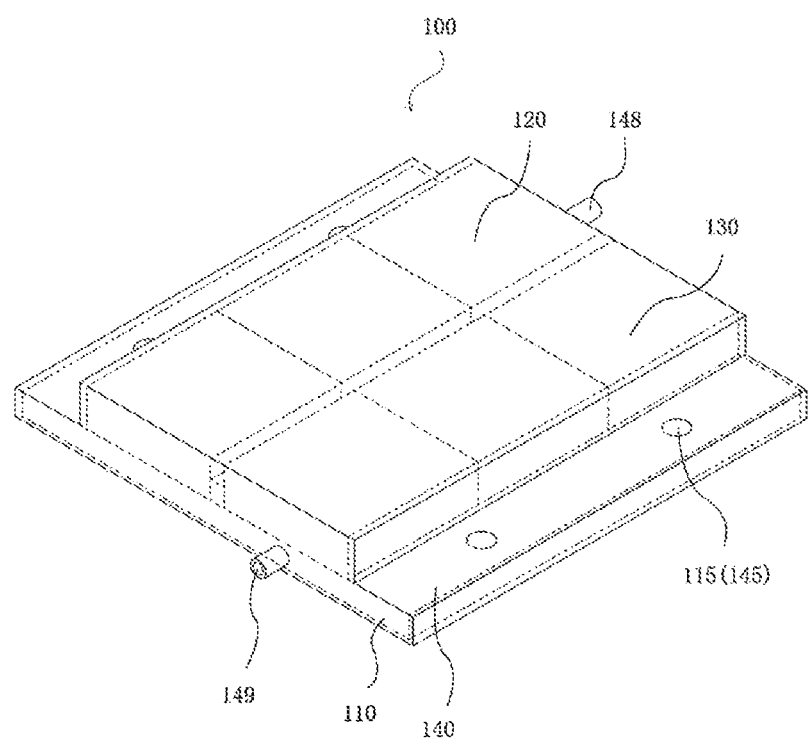
FIG. 6 is a schematic structural view of the base plate, the magnetic pole unit and the housing according to the first embodiment of the present application.

Then, as shown in FIGS. 5 to 6, the housing 140 may be mounted onto the base plate 110, the first magnetic pole unit 120 and the second magnetic pole unit 130. And a sealed cavity is formed between the housing 140 and the base plate 110.

Specifically, before mounting the housing 140, the adhesive (for example, dispensing or coating the adhesive by glue line) may be applied to the front surface 121a of the first magnetic pole unit 120 and the front surface 131a of the second magnetic pole unit 130 for bonding the front surface 121a and the front surface 131a to the housing 140.

The housing 140 is mounted to the base plate 110, the first magnetic pole unit 120 and the second magnetic pole unit 130, such that the first portion 141a of the housing 140 covers the first magnetic pole unit 120 and the second magnetic pole unit 130, and the second portion 141b and the third portion 141c of the housing 140 cover portions, at two sides of the magnetic pole units 120 and 130, of the base plate 110.

After the housing 140 is mounted to the base plate 110, the first magnetic pole unit 120 and the second magnetic pole unit 130, the housing 140 and the first magnetic pole unit 120 and the second magnetic pole unit 130 may be pressed such that the adhesive between the first portion 141a of the housing 140 and the front surface 121a of the first magnetic pole unit 120 and the front surface 131a of the second magnetic pole unit 130 is completely and uniformly spread, thereby filling the gap between the housing 140 and the first magnetic pole unit 120 and the second magnetic pole unit 130, and heating the curing adhesive.

After covering the housing 140 on the first magnetic pole unit 120 and the second magnetic pole unit 130 and the base plate 110, the first magnetic pole unit 120, the second magnetic pole unit 130 are integrally sealed in the housing 140, and the side surfaces, end surfaces of the base plate 110 are also covered, and only the back surface of the base plate 110 is exposed.

Thereafter, the outer seam between the housing 140 and the base plate 110 may be sealed with an encapsulant, and then the encapsulant is cured, whereby the housing 140 and the base plate 110 form the sealed cavity for accommodating the magnetic pole units 120, 130.

The housing 140 may also include a vacuum nozzle 148 and an injection nozzle 149 arranged on two end surfaces of the housing 140, respectively.

Figure 7:
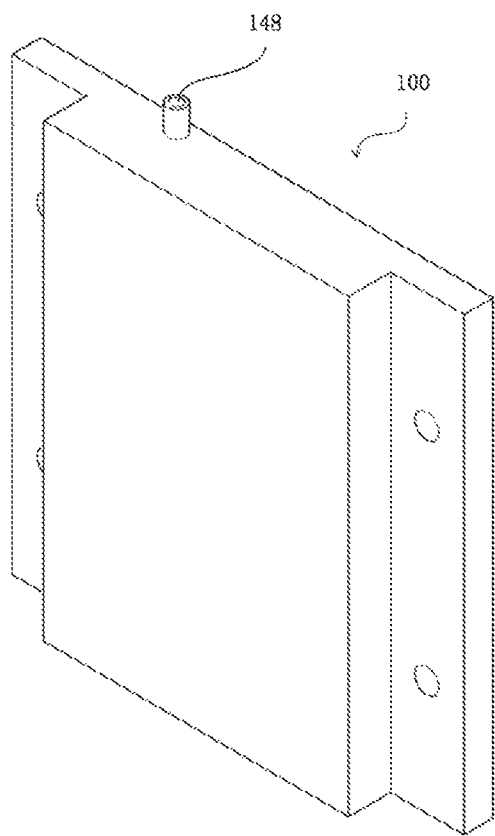
FIG. 7 is a schematic structural view of the magnetic pole module (including an injection nozzle and a vacuum nozzle) according to the first embodiment of the present application.

As shown in FIG. 7, the magnetic pole module 100 shown in FIG. 6 is vertically placed, and the vacuum nozzle 148 is connected to a vacuum pipeline to evacuate an interior of the magnetic pole module 100. The injection nozzle 149 from the axial bottom of the housing 140 is connected to the glue injection pipeline, and the resin is, under vacuum, poured into the interior of the sealed cavity formed by the housing 140 and the base plate 110, so that the resin is completely filled in all gaps between the housing 140 and the base plate 110, and between the housing 140 and the magnetic pole units 120, 130, and after the vacuum resin infusion is completed, the cured resin is heated.

In the present embodiment, the sealed cavity formed by the housing 140 and the base plate 110 is sealed and filled in a vacuum resin infusion manner, and the housing 140 and the magnetic pole units 120, 130 may be ensured to be in contact with each other when the housing 140 is thinner. However, other glue injection means can also be used, for example, if the housing 140 is thicker and the stiffness is larger, a positive pressure glue injection means may be used.

As shown in FIG. 8, after the vacuum resin infusion is completed, the vacuum nozzle 148 and the injection nozzle 149 on the housing 140 may be removed or cut off, then the two end surfaces of the housing 140 are polished to be flat, the burrs are removed, and the sealant is applied to the position after the injection nozzle 149 and the vacuum nozzle 148 are removed for sealing, for example, the sealant is used to block the exposed glue injection port and the vacuum port. Heating the curing sealant, completing the sealing of the magnetic pole module 100, thereby completing the manufacturing of the single magnetic pole module 100.

As shown in FIG. 9, multiple magnetic pole modules 100 are assembled onto the rotor yoke 150 provided with threaded holes (not visible in the figures). The magnetic pole module 100 is positioned by tooling or mechanical arms to align the base plate through holes 115 and the housing through hole 145 of the magnetic pole module 100 with the threaded holes on the rotor yoke 150 in one-to-one correspondence. Multiple magnetic pole modules 100 are mechanical fixed to the rotor yoke 150 by allowing multiple fasteners 170 (spacers 160 may be added) to pass through multiple base plate through holes 115, multiple housing through holes 145 and multiple threaded holes on the rotor yoke 150, respectively, so as to achieve the mechanical fixation for the magnetic pole module 100. After mechanical fixation, the encapsulant may be used to coat on the exposed fastener 170, the spacer 160, the base plate through hole 115, the housing through hole 145 and the threaded hole in the rotor yoke 150 and is heated to cure the coating for sealing the place. After all of the assembly of the magnetic pole module 100 is completed, the entire magnetic pole module 100 is subjected to vacuum resin infusion, so that the gaps between the magnetic pole module 100 and the rotor yoke 150, the fastener 170, the spacer 160 and the base plate through hole 115, the housing through hole 145 and the threaded hole on the rotor yoke 150 are effectively filled and sealed.

As shown in FIG. 9, when the magnetic pole module 100 is assembled, magnetic pole units adjacent in the circumferential direction in different magnetic pole modules 100 may be spaced apart from each other by a second distance d2 along the circumferential direction of the rotor yoke 150.

Further, as shown in FIG. 9, the pole modules 100 adjacent in the circumferential direction may be spaced apart from each other by a specific distance (for example, a fifth distance d5 as described above) along the circumferential direction of the rotor yoke 150. Meanwhile, the polarities of the magnetic pole units adjacent in the circumferential direction in different magnetic pole modules need to be ensured to be opposite when assembled, and the polarities of the magnetic pole units adjacent in the axial direction in different pole modules are the same.

An alternative magnetic pole module 200 and the rotor 2000 of the electric machine according to a second embodiment of the present application and a method for manufacturing the magnetic pole module 200 and the rotor 2000 of the electric machine will be described below in conjunction with FIGS. 10 to 13. The magnetic pole module 200 according to the second embodiment differs from the magnetic pole module 100 according to the first embodiment in that: no through holes are provided on the base plate 210 and the housing 240 of the magnetic pole module 200, and other portions of the structural features may be the same. The rotor 2000 of the electric machine differs from the rotor 1000 of the electric machine according to the first embodiment in that: the rotor 2000 of the electric machine further includes a clamping bar 280, and the magnetic pole module 200 is mechanically secured to the rotor yoke 250 by the clamping bar 280. Thus, in the following description, these differences will be described in detail, whereas parts that are the same as or similar to the first embodiment will be briefly described or omitted, and it will be understood by those skilled in the art that the first and second embodiments may be used in combination.

Figure 10:
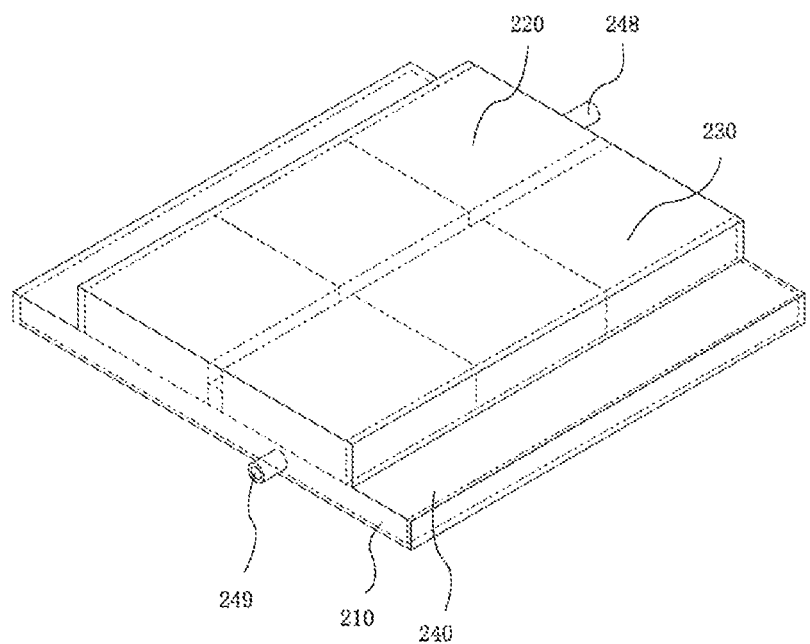
FIG. 10 is a schematic structural view of the base plate, the magnetic pole unit and the housing of the magnetic pole module according to a second embodiment of the present application.

As shown in FIG. 10, the magnetic pole module 200 may basically include a base plate 210, a pair of magnetic pole units (a first magnetic pole unit 220 and a second magnetic pole unit 230) and a housing 240. The pair of magnetic pole units 220, 230 is arranged on the base plate 210 and is spaced apart from each other by a predetermined distance (the first distance d1 as described above). The housing 240 covers the pair of magnetic pole units 220, 230, and the pair of magnetic pole units 220, 230 are sealed. An injection nozzle 249 and a vacuum nozzle 248 (removed after the vacuum infusion resin) are provided on two end surfaces of the pair of magnetic pole units 220, 230, respectively.

Figure 13:
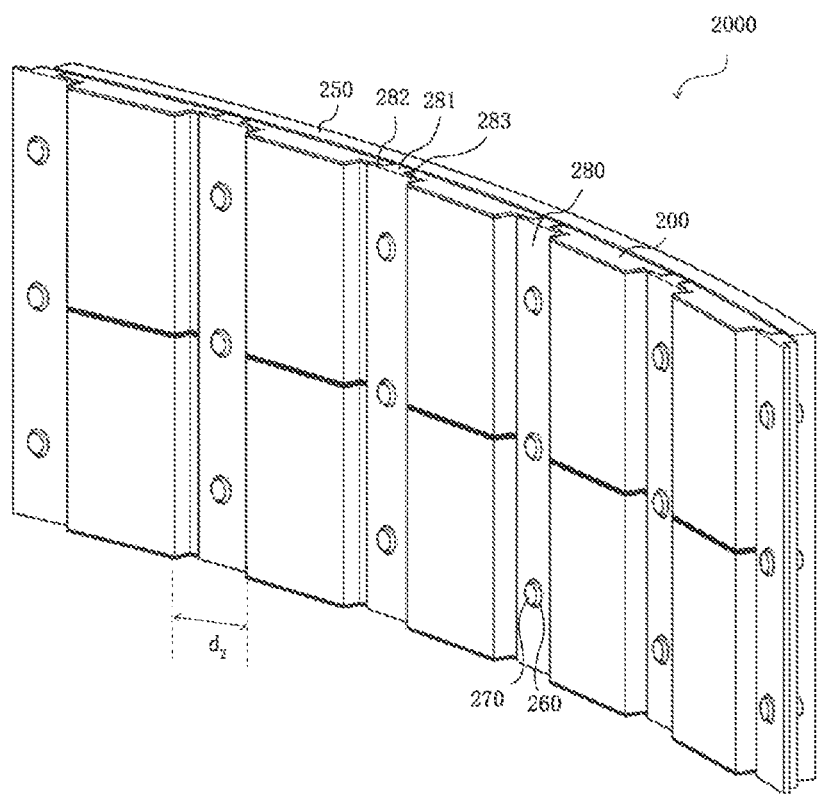
FIG. 13 is a schematic structural view of a portion of the rotor of the electric machine according to the second embodiment of the present application.

The magnetic pole module 200 is not provided with a through hole. As shown in FIG. 13, multiple magnetic pole modules 200 may be mechanically secured to the rotor yoke 250 by the clamping bar 280 and a fastener 270.

Figure 11:
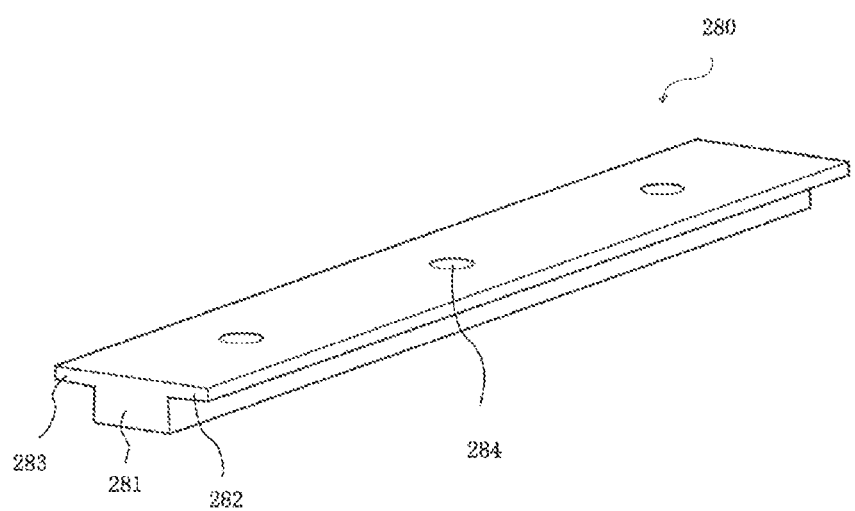
FIG. 11 is a schematic structural view of a clamping bar according to the second embodiment of the present application.

As shown in FIG. 11, the clamping bar 280 may include a protruding portion 281, a first edge portion 282, and a second edge portion 283, and the first edge portion 282 and the second edge portion 283 located on two sides of the protruding portion 281. A thickness of the protruding portion 281 may be greater than a thickness of the first edge portion 282 and the second edge portion 283 to match the shape of the magnetic pole module 200. The clamping bar 280 may also include multiple through holes 284 arranged along the length direction. Preferably, multiple through holes 284 may be arranged along an axial centerline of the clamping bar 280.

Figure 12:
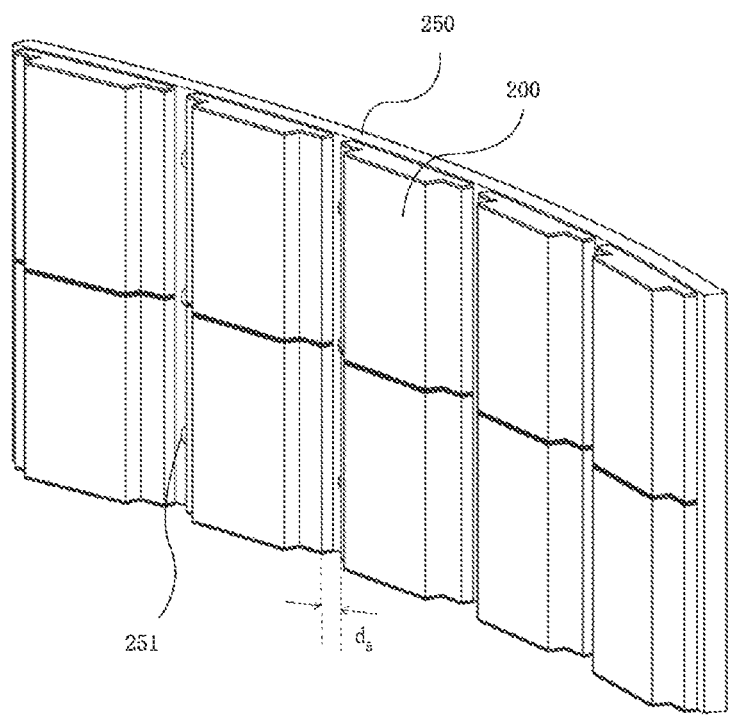
FIG. 12 is a schematic structural view of a portion of a rotor of an electric machine according to the second embodiment of the present application.

Furthermore, as shown in FIG. 12, multiple threaded holes 251 may be provided on thee rotor yoke 250, and the distance that the threaded holes are spaced apart from each other along the circumferential direction of the rotor yoke 250 may be greater than the width of the magnetic pole module 200. The magnetic pole module 200 may be arranged on two sides of the axial column of threaded holes 251. Further, the distance between each threaded hole 251 on the rotor yoke 250 along the axial direction is equal to the distance between the through holes 284 on the clamping bar 280 shown in FIG. 11.

As shown in FIGS. 12 and 13, multiple magnetic pole modules 200 may be positioned on the rotor yoke 250 by tooling or mechanical arms, and two magnetic pole modules 200 adjacent in the circumferential direction may be spaced apart from each other by a predetermined distance (the fifth distance d5 as described above). The predetermined distance may be equal to or slightly greater than the width of the protruding portion 281 of the clamping bar 280.

After positioning the magnetic pole module 200 by the tooling or mechanical arms, as shown in FIG. 13, the clamping bar 280 may be arranged between the two columns of magnetic pole modules 200, such that the protruding portion 281 of the clamping bar 280 is arranged in the gap between the two columns of magnetic pole module 200 adjacent in the circumferential direction and allows the first edge portion 282 and the second edge portion 283 of the clamping bar 280 to press against adjacent magnetic pole modules 200, respectively, while aligning multiple through holes 284 on the clamping bar 280 with multiple threaded holes 251 on the rotor yoke 250. The fastens 270 (the spacer 260 may be added) pass through the through hole 284 and the threaded hole 251 to mechanically fix the magnetic pole module 200 to the rotor yoke 250.

As shown in FIG. 13, the length of the clamping bar 280 shown in the figures may correspond to the length of the two magnetic pole modules 200. However, the present application is not limited thereto, and the clamping bar 280 may have a length capable of simultaneously holding multiple magnetic pole modules 200, which may be varied according to the actual application. In addition, the number of through holes 284 on the clamping bar 280 may also be varied depending on the actual application as long as it corresponds to the number of threaded holes 251 provided on the rotor yoke 250.

By providing the clamping bar 280, the magnetic pole module 200 may be efficiently mechanically secured to the rotor yoke 250.

Similar to the arrangement of the magnetic pole modules 100 in the rotor 1000 of the electric machine according to the first embodiment, the distance between two columns of magnetic pole units (the first magnetic pole unit 220 and the second magnetic pole unit 230) in one magnetic pole module 200 is the first distance d1, while the distance between adjacent two columns of magnetic pole units in two adjacent magnetic pole modules 200 is the second distance d2, and d1 is not equal to d2. In the present embodiment, d1<d2.

A method for manufacturing the magnetic pole module 200 and the rotor 2000 of the electric machine according to the second embodiment of the present application will be described below with reference to FIGS. 10 to 13.

The magnetic pole module 200 is similar to the method for manufacturing the magnetic pole module 100 according to the first embodiment, except that the base plate 210 and the housing 240 are not provided with through holes. Therefore, the method for manufacturing the magnetic pole module 200 (for example, the structural features, assembly, or spatial relationships of the base plate 210, the magnetic pole units 220 and 230 and the housing 240) will not be described in detail herein. The first and second embodiments may be combined with each other to produce embodiments that are not described in detail.

Next, a method for manufacturing the rotor 2000 of the electric machine according to the second embodiment of the present application will be described in detail.

After the magnetic pole module 200 is made by a method similar to the method for manufacturing the magnetic pole module 100 described above, multiple magnetic pole modules 200 are positioned on the rotor yoke 250 by tooling or mechanical arms, and multiple threaded holes 251 are provided in the rotor yoke 250. And the magnetic pole modules 200 may be arranged on two sides of the axial column of threaded holes 251, as shown in FIG. 12.

Thereafter, the clamping bar 280 may be arranged between the two columns of magnetic pole module 200, such that the protruding portion 281 of the clamping bar 280 is arranged in the gap between the two columns of magnetic pole modules 200 adjacent in the circumferential direction and causes the first edge portion 282 and the second edge portion 283 of the clamping bar 280 to press against the adjacent magnetic pole modules 200, respectively, while aligning the multiple through holes 284 on the clamping bar 280 with the multiple threaded holes 251 on the rotor yoke 250 in one-to-one correspondence, and the fastens 270 (the spacer 260 may be added) passes through the through hole 284 and the threaded hole 251 to mechanically fix the magnetic pole module 200 to the rotor yoke 250.

After assembly of the magnetic pole module 200 is completed, the distance between two columns of magnetic pole units (the first magnetic pole unit 220 and the second magnetic pole unit 230) in one magnetic pole module 200 is the first distance d1, while the distance between adjacent two columns of magnetic pole units in two adjacent magnetic pole modules 200 is the second distance d2, and d1 is not equal to d2. In the present embodiment, d1<d2.

After all assembly of the multiple magnetic pole modules 200 is completed, the vacuum resin infusion may be performed on all of the magnetic pole modules 200 as a whole, so as to achieve effective glue filling and sealing for the gap between the magnetic pole module 200 and the rotor yoke 250, and the respective gaps in the fasteners 270, the spacers 260 and the through holes 284 on the clamping bar 280, the threaded holes 251 on the rotor yoke 250.

The rotor 2000 of the electric machine according to the second embodiment may be more efficiently mechanically secure the reliably sealed magnetic pole module 200 to the rotor yoke 250 by using utilizing a "clamping bar and fastener fixing" method. The magnetic pole module 100 or 200 is mechanically secured to the rotor yoke by providing through holes on the magnetic pole module 100 or using the clamping bar 280, which is described above, and the present application is not limited thereto. Another mechanical fixation method may be considered, without departing from the technical conception and scope of the present application, such that the rotor of the electric machine according to the present application can take account for generator performance (cogging torque, torque pulsation), magnetic pole protection and magnetic pole mechanical fixation The specific embodiment of the present application is described in detail above, while certain embodiments have been shown and described in detail, and it should be understood by those skilled in the art that various combinations, modifications and improvements of these embodiments may be made (for example, different technical features of the present application may be combined to obtain a new technical solution) without departing from the principles and spirit of the present application as defined by the appended claims. Such combinations, modifications and improvements should also be within the protection scope of the present application.

The invention claimed is:

1. A rotor of an electric machine, comprising:
a rotor yoke, and
a plurality of magnetic pole modules arranged on the rotor yoke,
wherein:
each of the plurality of magnetic pole modules comprises a base plate, a housing and a pair of magnetic pole units, and the pair of magnetic pole units of opposite polarities is accommodated in an accommodating cavity formed by the base plate and the housing, the pair of magnetic pole units in each of the magnetic pole modules are spaced apart from each other by a first distance in a circumferential direction of the rotor yoke;
a protrusion is provided on the base plate, the protrusion being arranged axially on a front surface of the base plate and fixed on a symmetrical centerline of the base plate; and
each magnetic pole unit in the pair of magnetic pole units comprises a plurality of magnetic poles aligned in an axial direction parallel to a central rotational axis of the rotor of the electric machine and having a same polarity, each of the plurality of magnetic poles abutting against the protrusion.

2. The rotor of the electric machine according to claim 1, wherein adjacent magnetic pole units of different magnetic pole modules adjacent in the circumferential direction are spaced apart from each other by a second distance in the circumferential direction of the rotor yoke, and the first distance is different from the second distance.

3. The rotor of the electric machine according to claim 1, wherein the different magnetic pole modules adjacent in the circumferential direction are spaced apart from each other by a predetermined distance in a circumferential direction of the rotor yoke.

4. The rotor of the electric machine according to claim 1, wherein the front surface of each magnetic pole unit is bonded to an inner surface of the housing by an adhesive.

5. The rotor of the electric machine according to claim 1, wherein all gaps among the housing, the base plate and the pair of magnetic pole units are filled with resin.

6. The rotor of the electric machine according to claim 1, wherein a plurality of base plate through holes is arranged on the base plate, a plurality of housing through holes corresponding to the plurality of the base plate through holes is arranged on the housing, and a plurality of threaded holes is arranged in the rotor yoke, the plurality of base plate through holes and the plurality of threaded holes are aligned with each other, and the magnetic pole module is mechanically fixed on the rotor yoke by allowing fasteners passing through the plurality of the base plate through holes, the plurality of the housing through holes and the threaded holes.

7. The rotor of the electric machine according to claim 1, wherein a plurality of the magnetic pole modules is arranged on the rotor yoke in rows along the circumferential direction of the rotor yoke, each magnetic pole module of a row of magnetic pole modules is aligned with each other in the circumferential direction of the rotor yoke, and the plurality of the magnetic pole modules is arranged in columns on the rotor yoke in the axial direction, each magnetic pole module of a column of magnetic pole modules is aligned with each other in the axial direction.

8. The rotor of the electric machine according to claim 1, wherein the polarities of the magnetic pole units adjacent in the circumferential direction in different magnetic pole modules are opposite, and the polarities of the magnetic pole units adjacent in the axial direction in different magnetic pole modules are the same.

9. A magnetic pole module, comprising:
a base plate;
a first magnetic pole unit and a second magnetic pole unit arranged on a front surface of the base plate, in which the first magnetic pole unit and the second magnetic pole unit have opposite polarities and are spaced apart from each other by a first distance;
a protrusion arranged axially on the front surface of the base plate and fixed on a symmetrical centerline of the base plate, wherein each of the first and second magnetic pole units comprises a plurality of magnetic poles aligned in an axial direction and having a same polarity, each of the plurality of magnetic poles abutting against the protrusion; and
a housing, mounted to the first magnetic pole unit, the second magnetic pole unit, and the base plate.

10. The magnetic pole module according to claim 9, wherein the first magnetic pole unit and the second magnetic pole unit are bonded together with an inner surface of the housing by an adhesive.

11. The magnetic pole module according to claim 9, wherein the base plate comprises a plurality of base plate through holes arranged on two sides of the base plate, the housing comprises a plurality of housing through holes arranged on two sides of the housing, and the plurality of the base plate through holes are aligned with the plurality of the housing through holes.

12. The magnetic pole module according to claim 9, wherein all gaps between the housing, the base plate, the first magnetic pole unit and the second magnetic pole unit are filled with resin.

13. The magnetic pole module according to claim 9, wherein the first magnetic pole unit and the second magnetic pole unit are spaced apart from each other in a width direction.

14. A method for manufacturing a rotor of an electric machine, comprising:
providing a protrusion on a base plate, the protrusion being arranged axially on a front surface of the base plate and fixed on a symmetrical centerline of the base plate;
arranging a pair of magnetic pole units with opposite polarities on the base plate side by side, and spacing a pair of magnetic pole units apart from each other by a first distance, wherein each magnetic pole unit in the pair of magnetic pole units comprises a plurality of magnetic poles aligned in an axial direction parallel to a central rotational axis of the rotor of the electric machine and having a same polarity, each of the plurality of magnetic poles abutting against the protrusion;
mounting a housing on the pair of magnetic pole units and the base plate, forming a sealed cavity between the housing and the base plate;
injecting a resin into the sealed cavity formed by the housing and the base plate, thereby forming the magnetic pole module; and
arranging a plurality of magnetic pole modules on the rotor yoke to allow adjacent magnetic pole units in different magnetic pole modules adjacent in a circumferential direction to be spaced apart from each other by a second distance along the circumferential direction of the rotor yoke, in which the first distance is different from the second distance.

15. The according to claim 14, wherein an adhesive is applied to the front surface of each magnetic pole unit in a pair of magnetic pole units for bonding the front surface to the housing before mounting the housing;
after the housing is mounted to a pair of magnetic pole units, the housing and the front surfaces of the pair of magnetic pole units are pressed and the adhesive between the housing and the front surface of the pair of magnetic pole units is fully spread; and
an external seam between the housing and the base plate is sealed to allow the housing and the base plate to form a sealed cavity.

16. The method according to claim 14, wherein the housing further comprises a vacuum nozzle and an injection nozzle arranged on two end surfaces of the housing, respectively, the method further comprises following steps:
injecting resin into an interior of the sealed cavity foil led by the housing and the base plate by the means of the vacuum nozzle and the injection nozzle, which allows all gaps among the housing, the base plate and the pair of magnetic pole units to be filled with resin,
removing the vacuum nozzle and the injection nozzle after resin infusion is completed, and
applying an encapsulant to a position, where the injection nozzle and the vacuum nozzle are removed, for sealing.

17. The method according to claim 14, wherein a plurality of base plate through holes is arranged on the base plate, a plurality of housing through holes is arranged on the housing, and a plurality of threaded holes is arranged on the rotor yoke, the method further comprises following steps:

mechanically fixing the plurality of the magnetic pole modules to the rotor yoke by allowing the plurality of fasteners to pass through the plurality of the base plate through holes, the plurality of the housing through holes and the plurality of the threaded holes, respectively; and making the polarities of the magnetic pole units adjacent in the circumferential direction in the different magnetic pole modules be opposite, and the polarities of the magnetic pole units adjacent in the axial direction in the different magnetic pole modules be the same.

\* \* \* \* \*